J. I. SILBAR.
AUTOMOBILE THIEF ALARM.
APPLICATION FILED APR. 7, 1917.

1,271,624.

Patented July 9, 1918.

INVENTOR:
J. I. Silbar,
BY HIS ATTORNEY:
A. M. Carlsen.

UNITED STATES PATENT OFFICE.

JOSEPH I. SILBAR, OF ST. PAUL, MINNESOTA.

AUTOMOBILE THIEF-ALARM.

1,271,624.　　　　　Specification of Letters Patent.　　Patented July 9, 1918.

Application filed April 7, 1917. Serial No. 160,537.

*To all whom it may concern:*

Be it known that I, JOSEPH I. SILBAR, a citizen of the United States, residing at St. Paul, in the county of Ramsey and State of Minnesota, have invented a new and useful Automobile Thief-Alarm, of which the following is a specification.

My invention relates to thief alarms for automobiles, and the object is to provide a highly improved and efficient alarm device which will automatically ring a bell when a thief attempts to start or even only to enter an automobile during the absence of the owner or person authorized to use the automobile.

Figure 1:
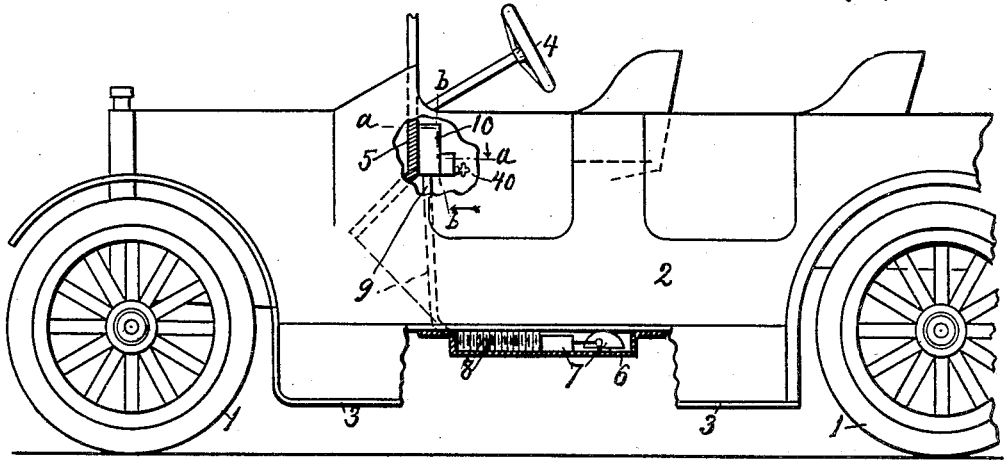
Figure 2:
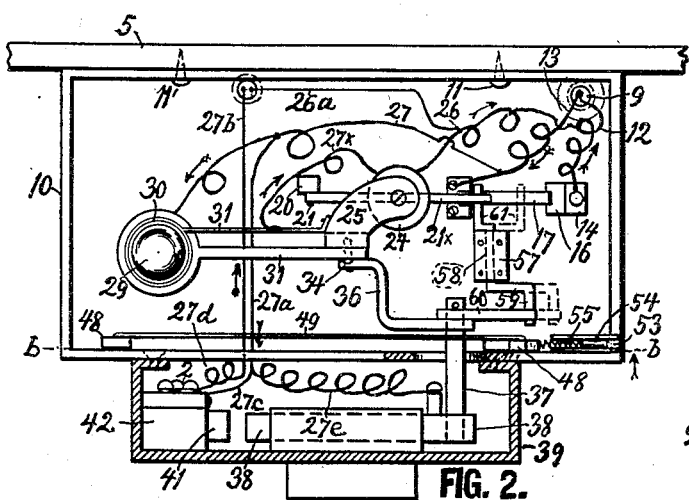
Figure 4:
Figure 5:
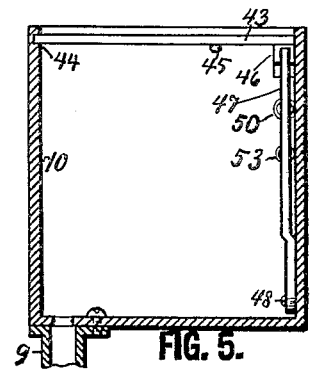
Figure 3:
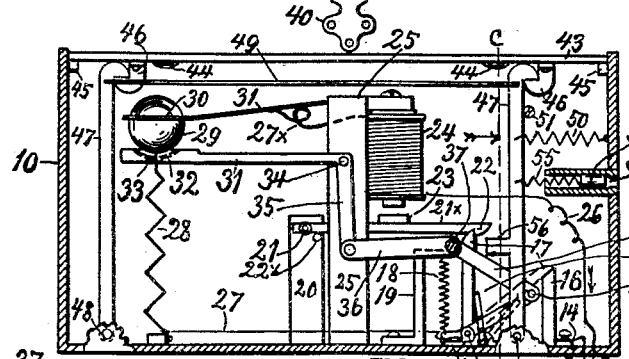
Figure 7:
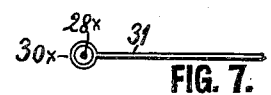
Figure 6:
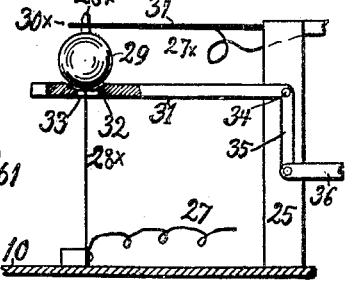
Figure 8:
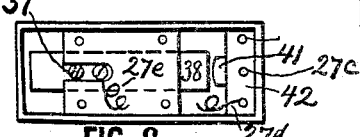

In the accompanying drawing, Figure 1 is a partly sectional side elevation of an automobile equipped with my alarm device. Fig. 2 is an enlarged partly sectional view about as on the line $a$—$a$ in Fig. 1, looking downward into the mechanism chamber and lock casing of the alarm device. Fig. 3 is a section on the line $b$—$b$ of Figs. 2 and 3, and the tube 9 in section. Fig. 4 is a detail view of the key by which the mechanism box is opened. Fig. 5 is a cross section on the line $c$—$c$ of Fig. 3 showing mainly the mechanism box, its cover and locking means, and showing the tube 9 in section. Fig. 6 is a modification of a portion of Fig. 3. Fig. 7 is a top view of the upper contact bar in Fig. 6. Fig. 8 is a detail view into the open side of the lock 46 in Fig. 2.

Referring to the drawing by reference numerals, 1 designates the ground wheels, 2 the body, 3 the footboard, 4 the steering wheel and 5 the dash board of an automobile.

Adapted to be secured in a suitable place on the car, preferably underneath it, is a casing or inclosure 6, (see Fig. 1) containing a loud electric bell 7 and an electric battery 8 adapted to furnish current to the bell and may also furnish it to the igniting spark plugs of the engine of the car if so desired. The wiring of said bell and battery extends through strong metal tubing 9 up into a mechanism box 10, which by screws 11 from within it is secured to the dash board 5 (see Fig. 2). In Figs. 2 and 3 will be seen that the electric wires 12, 13 extending up through the tube 9 are connected to two contact plates 14, 15, respectively. The plate 14 has a fixed post or switch member 16, while to the plate 15 is pivoted at 15$^\times$ an arm or switch member 17, which by a spring 18 from a bracket 19 is at all times ready to swing against the member 16 and thus close the circuit from the battery to the alarm bell 7. Said circuit closing is controlled and started by the following mechanism, all contained within the box 10 and mounted upon the floor or bottom of it. On a post 20 is pivoted at 21 a horizontally disposed arm 21$^\times$ having a ratchet tooth 22 engaging and holding the arm 17 in upright position. Said arm 21$^\times$ is held in horizontal position by a pin 22$^\times$ and is provided with an armature 23, above which is an electric magnet 24 mounted on a post 25.

From the wire 12 is taken an arm 26 to the lower end of the electromagnet and from the wire 13 a wire arm 27 reaches as 27$^\times$ the upper end of the magnet through a switch composed of a resilient vertical wire 28 having at its upper end a metallic ball 29, spaced about which is a ring 30 of an arm 31 which is fixed on the post 25 and electrically connected to the magnet by the wire 27$^\times$, so that the least vibration of the ball 29 on its limber support 28 will cause it to touch the ring 30 and thereby close circuit over the electromagnet, with the result that the magnet will raise the armature lever 21$^\times$ and allow the spring 18 to close the bell switch 17—16 and thus cause the bell to ring an alarm as soon as the automobile is stirred at all by thieves or other persons who do not have the proper key and the knowledge how to use it. Such key and lock will presently be described, but first it may be mentioned that in the modification shown in Fig. 6 is illustrated that the support 28$^\times$ may be straight instead of spiral-shaped as 28 in Fig. 3. And the ring 30 or 30$^\times$ may be so small, as shown in Fig. 7, that it will embrace and be ready for contact with the standard 30$^\times$ instead of with the ball 29.

When it is not desired to have the ball 29 vibrate it is held still by an arm 31 having a cavity 32 for the ball and an aperture 33 for the support 28. Said lever is pivoted at 34 to the post 25 and is provided with a rocker arm 35, which is actuated by a link 36 and a stud 37. Said stud is fixed in the bolt or slide 38 of the regular lock 39 which is secured upon the side of the box 10 and has a key 40 by which the operator forces the bolt against an element 41 of a switch which turns electric current from wire 27$^a$ to wire 27$^b$ and to the igniting mechanism of the engine of the car, from whence it returns to the battery over a wire 26$^a$ and wire 26.

If the element 42 is a complete switch the current may pass to and from it over the wire arms 27$^c$ and 27$^d$, respectively; if the slide 38 be one of the switch members and the element 41 not a press button but a switch member, the current will pass over the wire 27$^c$ and through the wire 27$^d$ whenever the slide contacts with the element 41; in this event the wire arm 27$^c$ is omitted.

To prevent unwarranted access into the mechanism box 10, the same is closed by a cover 43, hingedly engaged at 44 with one side of the box and resting upon supports 45 inside the box; the other edge having two catches 46 engaged by two hook-bars 47, which are pivoted at 48 and connected by a link rod 49 so as to move in unison. One of the hook-bars is held by a light spring 50 against a pin 51 so as to hold both bars ready for engagement with the catches 46. When the cover is to be opened a wire key like 52 in Fig. 4 is inserted in a tube 53, which is fixed in one end wall of the box and by pressing against a plunger 54, a comparatively stiff spring 55 which connects the plunger with the adjacent hook bar will disengage the hook bars from the catches, provided that the key 40 has been so applied that the slide 38 has got its stud 37 moved away from a cam 56 on one of the hook bars, if said stud is against the cam, or directly against the hook bar, as when the igniting switch is thrown open and the key removed during the absence of the operator, the spring 55 will yield for the pressure of the key 52 and render its use ineffective. The plunger 54 is retained in the tube 53 by having the ends of the latter reduced in diameter, or by other suitable stopping means.

Upon the floor or bottom of the box 10 is journaled in a bearing 57 a rock shaft 58 having at one end a rocker arm 59 connected to the stud 37 by a link 60; at the other end it has a crank shaped rocker arm 61 arranged to raise the arm 17 of the bell switch into engagement with the armature lever whenever that service is required. The arm 61 also holds said switch arm 17 against accidental closing of the switch and ringing of the bell, when the automobile is in proper service, because during such service the stud 37 is over toward the left in the lock and thus holds the arm 61 against the member 19.

What I claim is:—

1. In an alarm device mounted on an automobile or other vehicle, a mechanism box, a concealed and protected electric bell and battery and wiring of same, some of said wiring extending into the mechanism box, said box having a lock, a slidable bolt or slide in the lock and a key for sliding the bolt, and mounted within said box a self-closing switch for the ringing of the bell, a pivoted catch arranged to hold the bell switch normally open; an armature on the catch, an electromagnet arranged to act on the armature and permit the bell switch to close, a switch arranged in the wiring to cause an electric current to energize the electro-magnet, said switch comprising a stationary ring-shaped switch member, and a vibratile switch member having a portion of it spaced within the ring, said vibratile member consisting of a vertically disposed resilient wire with a weight on it to induce vibration.

2. In an alarm device mounted on an automobile or other vehicle, a mechanism box, a concealed and protected electric bell and battery and wiring of same, some of said wiring extending into the mechanism box, said box having a lock, a slidable bolt or slide in the lock and a key for sliding the bolt, and mounted within said box a self-closing switch for the ringing of the bell, a pivoted catch arranged to hold the bell switch normally open; an armature on the catch, an electromagnet arranged to act on the armature and permit the bell switch to close, a switch arranged in the wiring to cause an electric current to energize the electro-magnet, said switch comprising a stationary ring-shaped switch member, and a vibratile switch member having a portion of it spaced within the ring, said vibratile member consisting of a vertically disposed resilient wire with a weight on it to induce vibration, and means operated by the slide for locking the vibratile member against vibration when the vehicle is in ordinary use.

3. In an alarm device mounted on an automobile or other vehicle, a mechanism box, a concealed and protected electric bell and battery and wiring of same, some of said wiring extending into the mechanism box, said box having a lock, a slidable bolt or slide in the lock and a key for sliding the bolt, and mounted within said box a self-closing switch for the ringing of the bell, a pivoted catch arranged to hold the bell switch normally open; an armature on the catch, an electromagnet arranged to act on the armature and permit the bell switch to close, a switch arranged in the wiring to cause an electric current to energize the electro-magnet, said switch comprising a stationary ring-shaped switch member, and a vibratile switch member having a portion of it spaced within the ring, said vibratile member consisting of a vertically disposed resilient wire with a weight on it to induce vibration, means operated by the sliding bolt for simultaneously arresting vibration of the vibratile member and for locking the bell switch in open position.

4. In an alarm device mounted on an automobile or other vehicle, a mechanism box, a concealed and protected electric bell and battery and wiring of same, some of said wiring extending into the mechanism box, said box having a lock, a slidable bolt or slide in the lock and a key for sliding the bolt, and mounted within said box a self-closing switch for the ringing of the bell, a pivoted catch arranged to hold the bell switch normally open; an armature on the catch, an electromagnet arranged to act on the armature and permit the bell switch to close, a switch arranged in the wiring to cause an electric current to energize the electro-magnet, said switch comprising a stationary ring-shaped switch member, and a vibratile switch member having a portion of it spaced within the ring, said vibratile member consisting of a vertically disposed resilient wire with a weight on it to induce vibration, means operated by the sliding bolt for simultaneously arresting vibration of the vibratile member and for locking the bell switch in open position, and for preventing unwarranted access into the mechanism box.

5. In an alarm device for automobiles, a mechanism box mounted on the car, a concealed and protected electric bell and battery and wiring of same, some of said wiring extending into the mechanism box; said box having a cover and lock and key, a slide in the lock moved by the key; and mounted within the box a self closing switch for the ringing of the bell, a catch for holding said bell switch open, an armature on the catch, an electromagnet arranged to act on the armature and permit the bell switch to close, a switch arranged in the wiring to cause electric current to energize the electromagnet, said switch having one stationary member and one vibratile member designed to close contact with the stationary member when vibrated by stirring of the car, a switch for turning electric current from said battery to the engine of the car, and means actuated by the slide for operating the switch leading to the engine, and for controlling the vibratile switch member, and for arresting the bell switch in open position, and for setting it in open position, and for releasing it so it may close, and for holding the cover of the box locked.

In testimony whereof I affix my signature.

JOSEPH I. SILBAR.